United States Patent [19]

Eckendorff

[11] 4,286,903
[45] Sep. 1, 1981

[54] TOOL ASSEMBLY FOR REPAIRING AND IN PARTICULAR GRINDING A TAP SEAT

[76] Inventor: Jean-Pierre Eckendorff, 29 Rue Aristide Briand, 27007 Evreux, France

[21] Appl. No.: 96,070

[22] Filed: Nov. 20, 1979

[30] Foreign Application Priority Data

Nov. 21, 1978 [FR] France .................................. 78 32802
Oct. 22, 1979 [FR] France .................................. 79 26120

[51] Int. Cl.³ ............................................. B23B 41/00
[52] U.S. Cl. ................................................. 408/83.5
[58] Field of Search ........................................ 408/83.5

[56] References Cited

U.S. PATENT DOCUMENTS

| | | | |
|---|---|---|---|
| 913,085 | 2/1909 | Williams | 408/83.5 |
| 1,939,767 | 12/1933 | Corvin | 408/83.5 |
| 2,385,589 | 9/1945 | Shepler | 408/83.5 |
| 4,090,805 | 5/1978 | Grimsley | 408/83.5 |
| 4,147,462 | 4/1979 | Appleby et al. | 408/83.5 |

Primary Examiner—Harrison L. Hinson
Attorney, Agent, or Firm—Charles E. Brown

[57] ABSTRACT

This relates to a tool assembly for repairing, and in particular, grinding a tap seat. The tool assembly includes a cutting tool carrier shaft and the primary features of the device are concerned with the guiding of the tool carrier shaft so that the tool carrier shaft is axially fixed without play in a guide while being free to rotate to effect the necessary machining operation.

17 Claims, 11 Drawing Figures

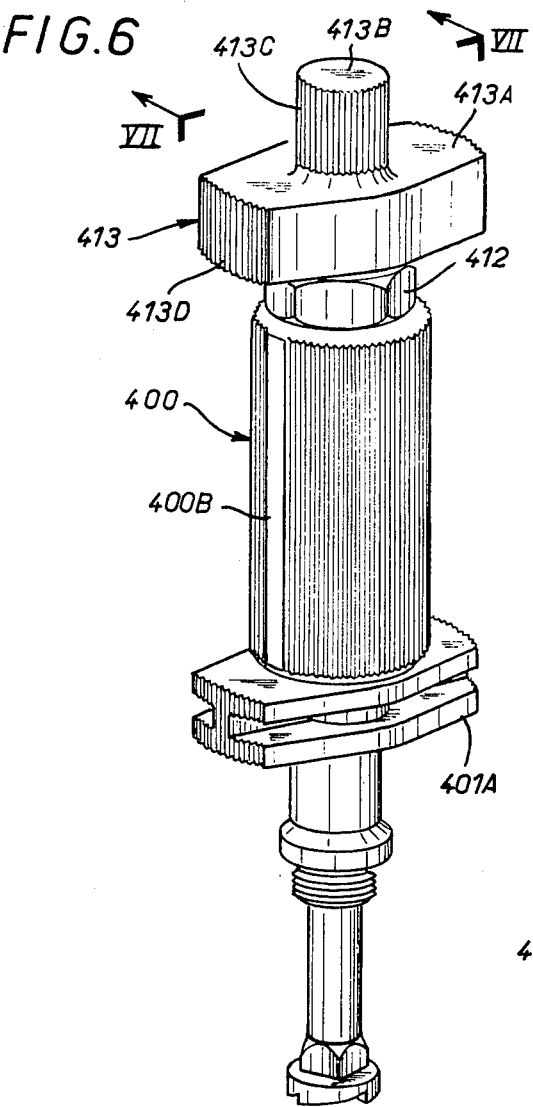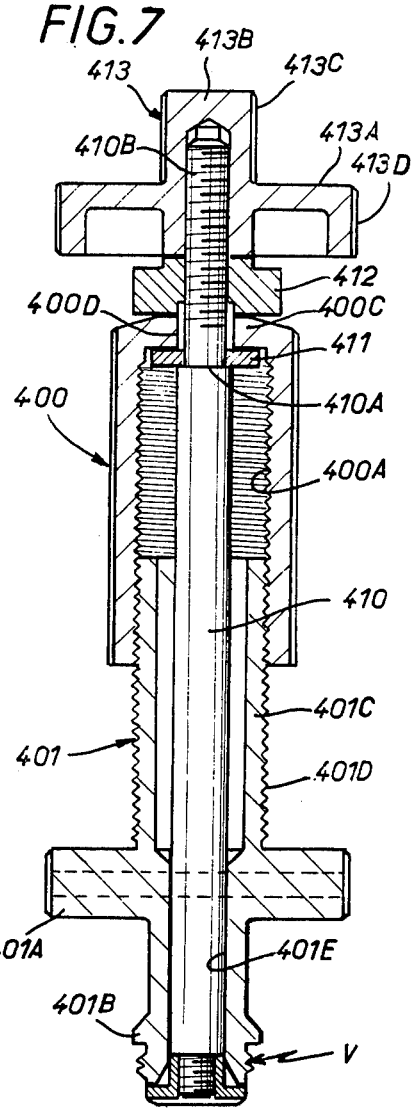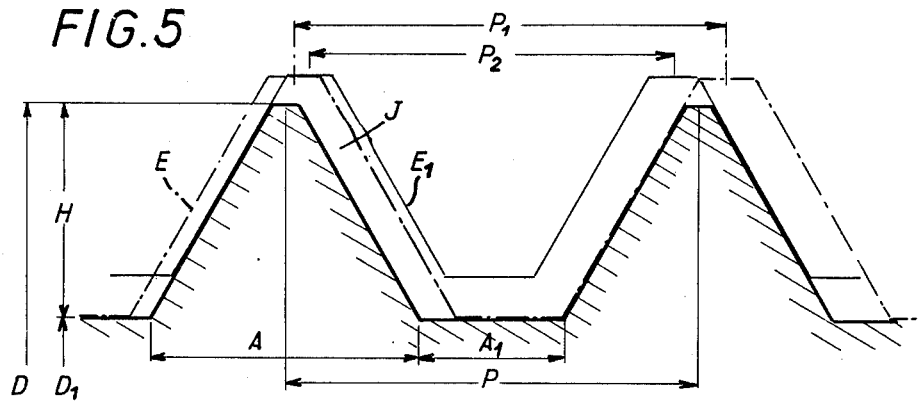

TOOL ASSEMBLY FOR REPAIRING AND IN PARTICULAR GRINDING A TAP SEAT

In the present applicant's French patent application No. 77 11989 filed on Apr. 21, 1977 and the first certificate of addition No. 78 06274 thereto dated Mar. 6, 1978, the present applicant described a tool assembly for in situ repair of a tap seat.

The tap assembly described therein comprises an adapter, a guide carried by the adapter, a tool carrier shaft with a rotary drive means, the above-mentioned adapter having an end portion comprising a screwthread which is complementary to that of the tap body and a support shoulder such that the end portion constitutes a replica of the tap body.

In a particular embodiment which forms the subject-matter of the above-mentioned first certificate of addition, which is intended in particular for restoring a tap seat by grinding thereof, the guide is associated by screwing with a casing member which extends the end portion, and it comprises a bottom portion forming a thrust bearing for the tool carrier shaft, whereby the thrust bearing is adapted to fix the axial position of the tool carrier shaft with respect to the guide and to determine the forward feed movement of the tool by rotation on the casing member which remains fixed.

Simultaneously with this axial fixing action, the tool carrier shaft is guided radially so that it cannot perform radial oscillatory movements which would have inevitable repercussions on the tool and moreover on the machining operation effected. For this purpose, it has been proposed that the tool carrier shaft may be radially guided at the position of the end portion, that is to say, over a portion of the tool carrier shaft which is adjacent the tool; more briefly, in such an embodiment, the tool carrier shaft is held at two spaced points, one being an axial fixing means disposed in the vicinity of the rotary drive means and the other being a radial guide means disposed in the end portion which is constructed for that purpose.

The present invention is generally concerned with guiding the tool carrier shaft; in an alternative form of the above-mentioned arrangements, the present invention seeks to incorporate in the tool assembly, guide means which are distributed over virtually the entire length of the tool carrier shaft in combination with axial fixing means, said means being capable not only of providing for a further improved axial and radial guiding action in respect of the tool carrier shaft, with tight production tolerances, but also making the device more flexible in operation.

In accordance with the present invention, the tool assembly is characterised in that, for axial fixing of the tool carrier shaft, the thrust bearing comprises a double-acting ball-bearing thrust means whose outer race is fixed with respect to the guide while the inner race is fixed with respect to the tool carrier shaft which is arranged for that purpose.

The tool carrier shaft is thus axially fixed without play in the guide, while being perfectly free to rotate.

In conjunction with the above-mentioned axial fixing action in respect of the tool carrier shaft, the tool assembly according to the present application is characterized in that the radial guide means comprise at least one anti-friction ring which is broached after being force-fitted into one and/or the other of the end portion-casing member components, said ring being adjusted with close production tolerances of the order of a hundredth of a millimeter, permitting free rotation of the tool carrier shaft without play.

In practice, two rings such as that discussed above are provided respectively in the end portion and in the casing member; they are broached jointly after being force-fitted into said components in such a way that their respective axes are in perfect alignment.

This results in such an arrangement that, at a terminal portion, the tool carrier shaft is adjacent the rotary drive means, being fixed axially with respect to the guide, without play, while in combination therewith the radial guide action is provided in two regions, respectively an intermediate region and a terminal region, plus a region formed by the ball-bearing type thrust means.

In accordance with another feature, the races of the ball-bearing thrust means comprise roller tracks with deep grooves which enclose the balls over at least half their great circular, thereby permitting such a ball-bearing thrust means to resist substantial axial thrust forces which may occur.

As regards the end portion, it is known that there are on the market many types of taps wherein the systems of assembling the tap head to the body, by a female thread or nut, are of different diameters and pitches, so that, in order to be capable of dealing with the range of diameters and pitches used, the above-discussed tool assembly must be supplied with as many end portions as there are types of tap body.

Another object of the present application seeks to limit the number of end portions by an arrangement thereof, the end portions being adapted to form an approximately satisfactory replica in respect of at least two different types of tap body nuts or female threads.

For this purpose, the end portion having a screwthread which is complementary to that of the body and a support shoulder on the terminal face of said body, is characterised by:

an end portion screwthread comprising at least one turn with a pitch which is intermediate the pitches of two different types of a range of types of tap body nuts;

a thread bottom diameter adapted to the smallest of the thread crest diameters of the two types of nut;

and a reduced-thickness thread profile which provides with respect to one or other of the nut profiles of the two types, a supplementary clearance which is at least equal to half the difference between the two pitches.

Practical tests show that with the same end portion of the above-described configuration, it is certain that there is at least one screw-nut contact region when the support shoulder of the end portion comes into abutment against the terminal face of the tap body, and that in this way it will be possible to hold the tool satisfactorily on at least two different types of tap body wherein the screwthreads are of very close diameters but of different pitches.

As an end portion can be fitted to at least two different types of tap body, it will be seen that the main advantage resulting from such an arrangement is a substantial reduction in the number of end portions which were previously required.

Another advantage of the supplementary clearance formed by the configuration of the profile of the screwthread turns is the resulting facility for producing the end portion by moulding, in particular in a suitable plastics material.

In accordance with a particular embodiment, the various components of the tool assembly, namely the adapter, the end portion, the guide and a drive wheel associated with the tool carrier shaft are advantageously formed by moulding a suitable plastics material.

In accordance with another embodiment, the adapter with its screwthread as defined above form an integral component.

A tool assembly of this kind, comprising components of plastics material, enjoys the advantage that it can be produced at high production rates; in addition, the number of components involved in production of the tool assembly is limited in particular by virtue of the adapter with its end portion comprising a single component.

In combination with the above-described arrangements, the invention provides a cutting tool which is specific to the machining operation to be performed, the tool being characterised in that it comprises a terminal engagement face with radial cutting teeth which are advantageously limited to three, and a shank portion in which there are provided four adjacent faces which are parallel to the axis of the cutter, defining four edges of which one is in alignment with a cutting tooth, the radial cutting teeth preferably being angularly spaced in an irregular manner.

A cutting tool of this kind can be entirely produced by milling so that there is no difficulty in producing the tool, while the alignment between an edge provided on the shank portion and a cutting tooth affords the advantage of forming a marker means for setting the cutter in place on a sharpener.

A tool assembly which in combination comprises the above-described arrangements (rigid fixing on a tap body, a guiding action in three vertically displaced regions of the tool carrier shaft, axial fixing of the tool carrier shaft without play with respect to the guide, and a tool with suitably distributed cutting teeth) makes it possible to machine a tap seat by grinding, with an absolutely perfect finish.

Other features and advantages of the invention will be apparent from the following description which is given by way of example with reference to the accompanying drawings in which.

Figure 10:
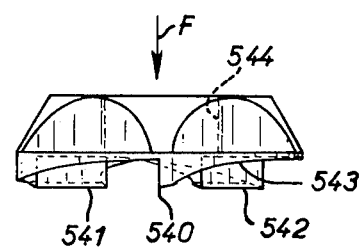
Figure 11:
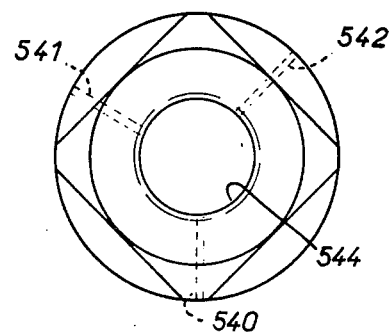
Figure 8:
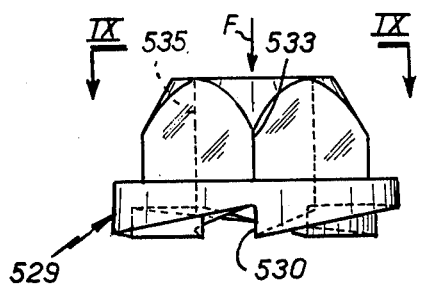
Figure 9:
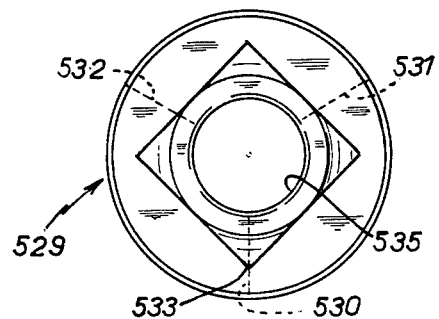
Figure 3:
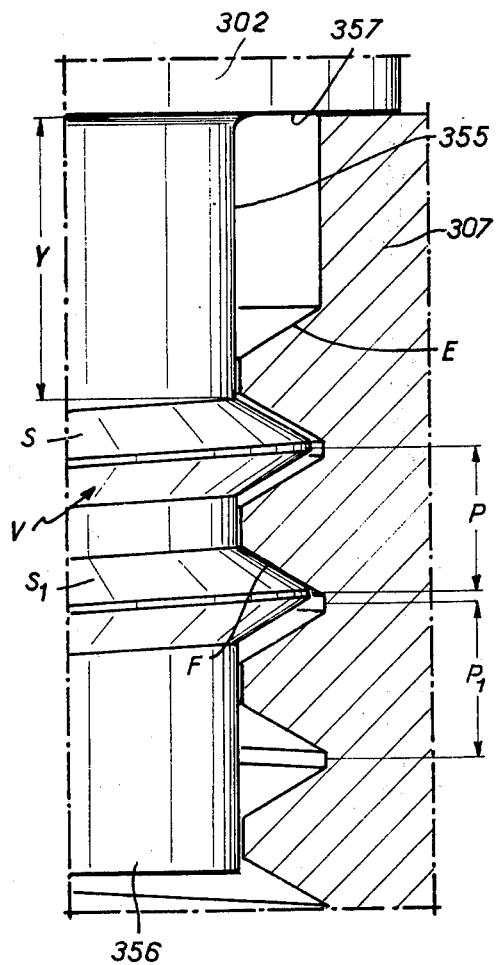
Figure 4:
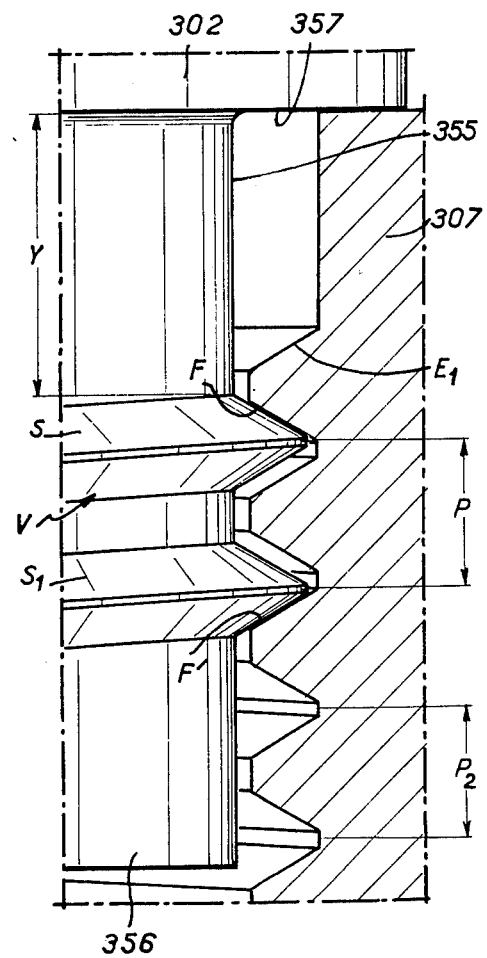

FIGS. 3 and 4 show views on an enlarged scale and by way of example of part of a screwthread on an end portion, in accordance with the invention, which is engaged into two nuts of different types, FIG. 5 shows a view on an even larger scale than the views of FIGS. 3 and 4 of a portion of screwthread in accordance with the invention, which is engaged in two nuts of different types, FIGS. 6 and 7 are a perspective view and a cross-sectional view respectively of an alternative form of a tool assembly according to the invention, FIG. 8 is an elevational view of a cutting tool, FIG. 9 is a view of the cutting tool of FIG. 8 as viewed in the direction indicated by arrow F in FIG. 8, and FIGS. 10 and 11 are views similar to those of FIGS. 8 and 9, of an alternative embodiment.

Figure 1:
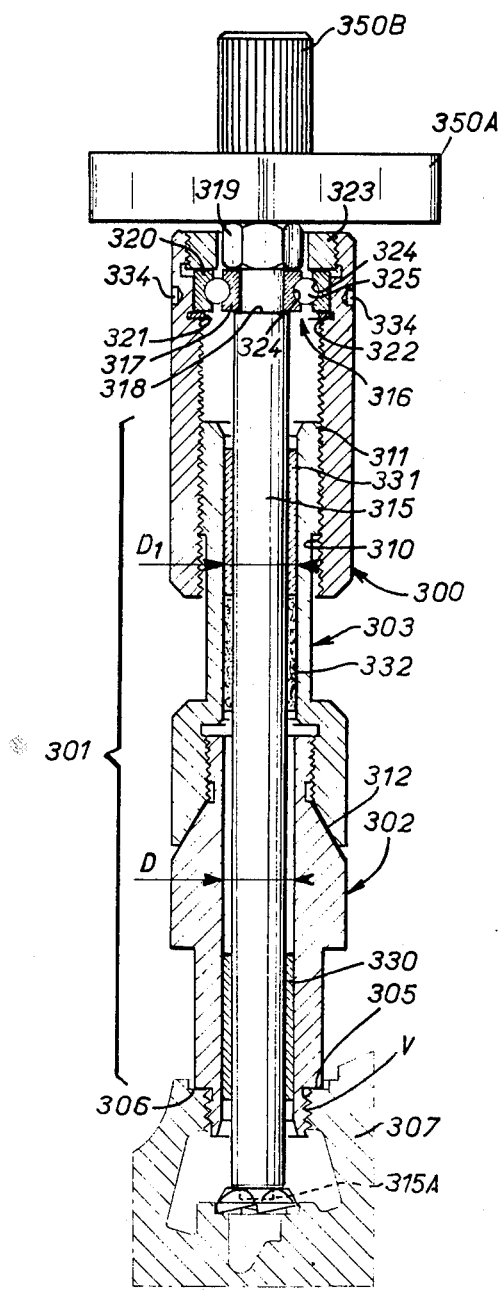
FIG. 1 is an elevational view in cross-section of a tool assembly according to the invention, for repairing a tap seat by grinding the seat.

In the selected embodiment shown in FIG. 1, the tool assembly for repairing a tap seat by grinding thereof comprises a guide 300 associated with an adapter which is indicated generally at 301 and which comprises an end portion 302 on which a casing member 303 is mounted. The end portion 302 preferably has a V-section screwthread whose characteristics will be set forth hereinafter, and a support bearing surface 305 which is intended to co-operate with a terminal face 306 in the tap body 307, the tap body being shown partly in phantom.

The guide 300 is associated with the casing member 303 by screwing and for this purpose it comprises a screwthread 310 adapted to co-operate with a fixing and forward feed screwthread 311 provided in the top part of the casing member, which moreover in its bottom part is associated with the end portion by screwing, alignment between the components 302 and 303 being ensured by a tapered bearing surface 312.

The tool carrier shaft 315 is axially fixed with respect to the guide 300 by means of a thrust bearing.

In accordance with the invention, the thrust bearing comprises a ball-bearing thrust means generally indicated at 316. The inner race or cage 317 of the ball-bearing thrust means is fixed with respect to the tool carrier shaft by means of a shoulder 318 provided on the shaft, and a clamping nut 319, while the outer cage or race 320 is fixed with respect to the guide 300 by bearing on a ring 321 which is inserted in a circular groove 322 provided in the guide, and by a ring 323 with an external screwthread.

In accordance with a particular feature of the ball-bearing thrust means, the roller tracks provided in each cage or race are formed by grooves 324 whose depth is such that the balls 325 are enclosed over the major part of their surface area; in other words, there is an extremely small clearance between the inner and outer races of the ball-bearing assembly.

In accordance with another particular feature of the ball-bearing thrust means in question, the grooves 324 comprise edges which do not have any sharp angles, being for example chamferred, rounded, or even better, a divergent region starting from the groove bottom, so that when a substantial axial thrust force is applied to a race, the thrust force does not mark the balls.

An important advantage which results from such an arrangement is that the ball-bearing thrust means, referred to as a double-acting thrust means, is capable of absorbing substantial axial forces, both thrust forces and traction forces, for example when the tool assembly is used badly, such as forcibly screwing the end portion 302 on to a tap body, with the axial position of the tool carrier shaft causing the tool to butt against the tap seat to be ground.

As regards radial guiding of the tool carrier shaft 315, in accordance with a preferred embodiment, the present invention provides an intermediate guide region in the casing member 303, a lower guide region in the end portion 302, and an upper guide region by virtue of the above-mentioned ball-bearing thrust means 316.

For this purpose, the casing member 303 and the end portion 302 are bored over their entire length to the same diameter D and D1 so that each can receive a ring 330 and 331 of anti-friction metal, for example bronze, which are forcibly fitted into position by means of a press.

The ring 330 is engaged into the end portion by way of the end which is towards the tap body, while as regards the casing member 303, the ring 331 is fitted into place by way of the end at which it is connected to the guide.

After this operation, the adapter 301 is formed by assembling the end portion 302 to the casing member 303, and the rings are then reamed or broached so as to provide perfect alignment thereon.

Another ring 332 of felt or the like, which is impregnated with oil, is tightly fitted into the bore D1 of the casing member, more particularly, in the space between the casing member and the end portion; a second ring similar to the above-mentioned ring 332 could also be fitted into the bore D in the end portion 302 above the anti-friction ring 330.

Two diametrically opposed marking means 334 are provided on the outside surface of the guide in order to check the axial movement of the tool carrier relative to the adapter, the marking means in the embodiment illustrated being produced by punching or drilling.

At the end remote from the tool, the tool carrier shaft 315 is provided with an operating wheel which has an oblong portion 350A adapted to facilitate gripping thereof, in order to carry out the grinding operation proper, the portion 350A itself being extended by a cylindrical portion 350B which is arranged to permit rapid rotary drive of the tool carrier, for the finishing operation.

It should be noted that in some cases, the tap seat is disposed within the tap body at a depth such that the maximum axial movement of the tool carrier of the above-described tool does not make it possible to repair the seat. So that such seats can be ground in accordance with the described method, the present invention provides supplementing the tool assembly by an accessory component which forms an extension member, as shown in FIG. 2.

Figure 2:
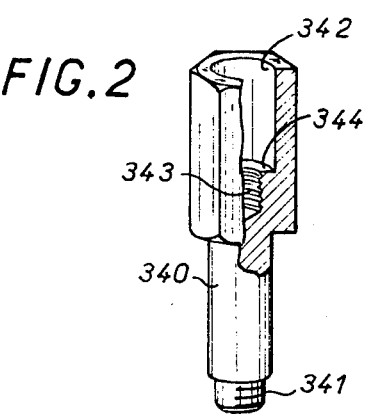
FIG. 2 shows a perspective view of an accessory which can be used in certain particular cases.

Referring to FIG. 2, the extension member is drawn from a six-sided bar and then machined so as to have a cylindrical portion of revolution 340 followed by a screwthread 341 adapted to receive the cutting tool. Internally, the extension member comprises a chamber 342 of the same diameter as the tool carrier 315, extended by a screwthread 343 adapted to receive the threaded end 315A of the tool carrier which normally carries the tool, a support bearing surface 344 being provided between the chamber 342 and the screwthread 343.

In combination with the above-described arrangements, the end portion 302 comprises a screwthread with at least one turn but preferably two turns, whose pitch is intermediate the pitches of two different types of a range of types of tap body nuts or female screwthreads.

A screwthread of this kind on an end portion of a tool assembly is shown on a larger scale in FIGS. 3, 4 and 5.

Referring now to FIGS. 3, 4 and 5, the end portion screwthread is indicated generally by V, while two different types in a range of types of tap body nuts are indicated by E and E1; P denotes the pitch of the screwthread on the end portion; P1 denotes the pitch of the nut E, P2 denotes the pitch of the nut E1; D denotes the diameter of the screwthread at the crests or tops of the turns; D1 denotes the diameter of the screwthread at the screwthread bottom; H denotes the height of the turns; A denotes the thickness of a turn at the base thereof and A1 denotes the distance between two turns.

In the embodiment illustrated, the diameter of the nuts E and E1 is 20 mm, the pitch of the nut E1 being 1.25 mm while the pitch of the nut E is 1.50 mm.

An end portion screwthread which is intended to be screwed on to either one of the two nuts indicated above comprises at least one turn but preferably two turns, as indicated at S and S1, on respective sides of which are provided on the one hand a relief portion 355 of constant height and on the other hand a cylindrical terminal portion of revolution 356.

The portion 355 is delimited by a bearing shoulder 357.

The end portion screwthread in the embodiment illustrated has an intermediate pitch P of 1.411 mm; it has a height H of 0.75 mm, a diameter D of 19.80 mm and a diameter D1 of 18.30 mm; the thickness A of the turns is 0.92 mm and the distance A1 between the two turns is 0.491 mm.

As can be clearly seen in particular in FIG. 5, the diameter D1 at the bottom of the thread formed by the turns is adapted to the smallest of the screwthread crest diameters of the two types of nut E and E1 selected.

Moreover, the reduced-thickness profile of the turns provides, with respect to one or other of the profiles of the nuts, a supplementary clearance J which is additional to the initial clearance which is normally provided between the male and female threads, so that the clearance between said components is at least equal to half the difference between the two pitches.

The groove 355 provided between the shoulder 306 of the adapter and the first turn S is of a diameter which is preferably equal to the bottom of the screwthread of the end portion, while the groove 355 is of a uniform height Y.

When the end portion 302 is screwed into a nut or female thread, and when the shoulder 306 on the end portion butts against the terminal face of the tap body 307, the tool assembly is fixed to the tap body by the contact of at least one portion of a thread turn with a side of the female screwthread.

In FIG. 3, the V-shaped screwthread on the end portion is screwed into the nut or female member E having a pitch of 1.5 mm, and it is part of the side F of the turn S1 which is in contact with a portion of the side of the screwthread as indicated at F1 of the nut or female member.

In FIG. 4, the V-shaped screwthread of the end portion is screwed into the nut or female member E1 having a pitch of 1.25 mm, and contact between the male thread and the female thread is established by the two turns of the end portion screwthread, respectively by a portion of the side F of the turn S and by a portion of the side F' of the turn S1.

Thus, the end portion screwthread, by virtue of its intermediate pitch, permits the tool assembly to be satisfactorily fixed on two types of tap body nuts or female threaded members.

The following table shows by way of example the characteristics of end portion screwthreads V according to the invention, for a range of nuts or female threaded members E.

TABLE

| NUTS (E) | | | SCREWS (V) | | | | |
|---|---|---|---|---|---|---|---|
| φ | P1 | P2 | PITCH | H | A | A1 | D | D1 |
| 16 | 1.5 | 1.25 | 1.411 | 0.75 | 0.92 | 0.491 | 15.80 | 14.80 |
| 17 | 1.5 | 1.337 | 1.411 | 0.83 | 1.07 | 0.341 | 16.60 | 14.94 |
| 18 | 1.5 | 1.25 | 1.411 | 0.75 | 0.92 | 0.491 | 17.80 | 16.30 |
| 19 | 1.5 | 1.25 | 1.411 | 0.75 | 0.92 | 0.491 | 18.80 | 17.30 |
| 20 | 1.5 | 1.25 | 1.411 | 0.75 | 0.92 | 0.491 | 19.80 | 18.30 |
| 21 | 1.814 | 1.5 | 1.65 | 1.09 | 1.37 | 0.28 | 20.80 | 18.62 |
| 22 | 1.5 | 1.25 | 1.411 | 0.75 | 0.92 | 0.491 | 21.80 | 20.30 |

TABLE-continued

| | NUTS (E) | | | SCREWS (V) | | | | |
|---|---|---|---|---|---|---|---|---|
| φ | P1 | P2 | PITCH | H | A | A1 | D | D1 |
| 23 | 1.5 | 1.25 | 1.411 | 0.75 | 0.92 | 0.491 | 22.80 | 21.30 |
| 26 ⅜ | 1.814 | 1.5 | 1.5 | 0.93 | 1.22 | 0.28 | 25.96 | 24.10 |

Reference will now be made to FIGS. 6 and 7 which show an alternative form of a tool assembly according to the invention.

In this embodiment, the tool assembly comprises a guide 400 in the form of a sleeve associated with an adapter which is indicated generally at 401 and which comprises, on respective sides of the tightening wheel 401A, an end portion 401B and a casing portion 401C.

The end portion with a screwthread V, the casing portion and the tightening wheel form a unitary adapter which is produced by moulding a suitable plastics material.

The casing portion 401C carries the guide 400 with which it is associated by a male thread-female thread system; for this purpose, the casing portion 401C comprises, over its entire height, a fixing and forward feed screwthread 401D co-operable with a screw-threaded bore 400A in the guide 400.

The guide 400 is also formed by moulding a suitable plastics material and it comprises a bottom portion 400C in which there is an axial opening 400D. The outside surface of the guide, in order to facilitate gripping thereof, comprises grooves which extend along generating lines, but the grooves are interrupted over a circumferential portion indicated at 400B. The ungrooved region 400B, which is advantageously flat, is intended to form a marking means, the purpose of which will become apparent hereinafter.

Internally, between the tightening wheel 401A and the free terminal part of the end portion 401B, the adapter comprises an axial passage 401E which is adapted to provide a guiding action for a tool carrier shaft 410 associated with and axially movable in the guide 400.

For this purpose, the tool carrier shaft 410 comprises a shoulder 410A against which bears an anti-friction washer 411 which is trapped between the shoulder 410A and the bottom portion of the guide; on the other side of the washer 411, the tool carrier shaft comprises a screw-threaded portion 410B on to which a tightening nut 412 and a drive wheel 413 are screwed.

It should be noted that the nut 412 is adjusted on the screw-threaded portion so as to permit the tool carrier shaft to rotate with axial play which is just necessary for such rotary movement, while the wheel 413 also forms a lock nut means for locking the nut 412.

The drive wheel on the tool carrier shaft 410 is also of moulded plastics material; it comprises a base portion 413A which is oblong in shape and on which is provided a cylindrical button portion 413B of revolution; vertical grooves 413C and 413D respectively are provided on the side faces of the portion 413A and on the outside surface of the portion 413B.

The tool assembly is advantageously completed by a cutting tool such as cutters as shown in FIGS. 8 to 11. In FIGS. 8 and 9, the cutter which is indicated generally at 529 is produced from a drawn component and has a terminal cutting face comprising three radial cutting teeth 530 to 532 which are disposed at 120° relative to each other, and a shank portion of square cross-section wherein one of the edges 533 is aligned with a cutting tooth, in the embodiment illustrated being the tooth 530.

The purpose of aligning the edge 531 with a cutting tooth is to form a machining marker point and to make it possible in particular when sharpening the cutting teeth to deal with the teeth successively in the order in which they were produced by milling.

An axial screw-threaded opening 535 is provided in the cutter for assembling the cutter to the tool carrier shaft.

In FIGS. 10 and 11, the cutting tool is generally similar to that described hereinbefore, but the radial cutting teeth have the particular feature of being arranged with an irregular angular offset relative to each other, for example an angle of 120° between one tooth 540 and one tooth 541; an angle of 105° between the tooth 541 and a tooth 542; and an angle of 135° between the tooth 542 and the above-mentioned tooth 540; for sharpening purposes, the tooth 540 is advantageously marked by means of a mark provided at the periphery of the rear portion of the tool.

In this way, only a single tooth at a time engages a preceding impression so that the force to be applied to the operating wheel to drive the tool in rotation may be applied virtually without effort.

It will be noted that each cutting tooth is extended by a relief portion 543 to facilitate release of the cuttings, while an axial screw-threaded bore 540 is provided to permit the tool to be fitted to the tool carrier.

It will be appreciated that the diameter of the cutting tools and the number of teeth may be different from the foregoing description, according to requirements, while being in accordance with the particular features described hereinbefore.

The tool assembly is advantageously completed by a tapered or conical finishing cutter with a single tooth (not shown), which is arranged to provide a chamfer on the edge of the seat, formed by the liquid inlet duct, this being in order to prevent damage to the seal on the tap head.

With such a tool assembly, it is necessary to determine the characteristics of the nut or female member in which it is to be fixed in order to select an adapter which can be fitted to one or other of the two different types of nuts or female members in a range of types thereof.

For carrying out a grinding operation, the tool assembly is prepared by unscrewing the guide which causes the shaft for carrying the tool to be retracted until the tool is brought into contact with the end portion, as shown in FIG. 7.

The tool assembly can then be fixed to the tap body after the head of the tap has been removed.

The cutting tool is brought into contact with the seat to be repaired, by screwing the guide on to the casing member or portion, the screwing action being stopped as soon as a resistance is felt at the guide.

At this stage, the angular position of the guide is checked by means of the marking means, and then the drive wheel for driving the tool carrier shaft is rotated in the clockwise direction and, at the same time, the guide is turned, the guide being rotated substantially more slowly than the drive wheel.

The rotary movement of the guide will generally be limited to one third or two thirds of a turn so that, depending on the pitch of the male thread-female thread system which connects the guide to the casing member or portion, the axial travel of the tool will correspond to removing a thickness of metal of from 0.3 to 0.5 mm.

When this operation, referred to as roughing out, is concluded, a finishing operation is performed by rapidly rotating the shaft carrying the tool by means of the rapid drive button portion, while the guide is rotated over a small angular distance, of the order of 0.5 mm.

While the cutter is still rotating and in order to ensure that it does not leave any traces on the tap seat, the guide is rapidly rotated in an anti-clockwise direction, the grinding operation thus being completed so that the tool assembly can be disconnected from the tap body.

After checking the seat, a cleaning operation will be effected, by means of rinsing, in order to remove the cuttings.

It will be appreciated that tap heads may comprise a screwthread of intermediate pitch in accordance with the invention, so that the same tap head could be fixed on to one or other of two tap bodies comprising a female thread of different pitch, the main advantage of such an application of the invention being to limit the stocks of tap heads substantially to half, hence giving a substantial saving in space and a substantial financial saving.

It will be appreciated that the invention is not limited to the selected embodiments illustrated in the drawings which on the contrary may be modified without thereby departing from the scope of the present invention. Thus, in a possible alternative embodiment, the nut 412, FIGS. 6 and 7, could be omitted by causing the end of the screw-threaded portion 410B of the tool carrier shaft to butt against the bottom of the screw-threaded bore in the wheel 413, while the wheel 413 would be adapted to rest on the upper end face of the guide 400, leaving the minimum clearance required for rotation thereof.

Likewise, in another alternative form, the wheel 413 of the tool carrier shaft could be moulded on to the portion 410B of the tool carrier shaft.

I claim:

1. A tool assembly for repairing and in particular grinding a tap seat, comprising a cutting tool carrier shaft, a guide carrying said shaft and an adapter carrying said guide, the adapter having an end portion forming a replica of the tap head normally associated with the tap body, with a screwthread which is complementary to that of said tap body, said end portion having mounted thereon a casing member comprising a screwthread for fixing and forwardly moving the guide, comprising a skirt portion with, at a terminal part, a thrust bearing for the tool carrier shaft, and having in its interior a screwthread capable of co-operating with said fixing and forward feed screwthread, the tool carrier shaft extending beyond the bearing to the operating means provided at its free end, characterised in that the thrust bearing comprises a double-acting ball-bearing thrust means whose outer race is fixed with respect to the guide while the inner race is fixed with respect to the tool carrier shaft which is arranged for that purpose, thereby to provide for axial fixing without play of the tool carrier shaft with respect to the guide, and further characterised in that at the same time the radial guiding action in respect of the tool carrier shaft is provided by means of at least one anti-friction ring which is broached after being force-fitted into one or other of the end portion-casing member components.

2. A tool assembly according to claim 1 characterised in that the radial guiding action in respect of the tool is provided by two broached rings of anti-friction metal such as bronze, one ring being force-fitted in the end portion at the end towards the connection to the body of the tap, and the other also being force-fitted into the casing member at the guide end, said rings being broached jointly.

3. A tool assembly to claim 1 or 2 characterised in that the casing member carries a felt ring around a portion of the tool carrier shaft, said ring being impregnated with a lubricant.

4. A tool assembly according to claim 1 characterised in that the races of the ball-bearing thrust means comprise deep grooves arranged to enclose at least half the circumference of the great circle of the balls in such a way that the resulting bearing is capable of carrying substantial longitudinal forces if such occur.

5. A tool assembly according to claim 4 characterised in that the inner ring is fixed with respect to the tool carrier shaft between a circular support shoulder provided in the shaft and a clamping nut which is screwed on to said shaft, while the outer ring is fixed with respect to the guide between a support means provided in the guide, and a nut screwed thereinto.

6. A tool assembly according to claim 1 characterised by:
   an end portion screwthread comprising at least one turn which is of a pitch intermediate the pitches of two different types of a range of types of tap body nuts or female members;
   a thread bottom diameter which is adapted to the smallest of the thread crest diameters of the two types of nuts;
   a reduced-thickness thread profile which provides with respect to one or other of the nut profiles of the two types, a supplementary clearance which is at least equal to half the difference between the two pitches.

7. A tool assembly according to claim 1 characterised in that the cutting tool is a milling cutter comprising a terminal cutting face having three radial teeth disposed at angles of 120° with respect to each other, and a shank portion of square cross-section, one of the apexes of the square being aligned with a cutting tooth.

8. A tool assembly according to claim 7 characterised in that the radial cutting teeth are distributed at an irregular angular displacement relative to each other.

9. A tool assembly according to claim 8 characterised in that the angular displacement of the teeth relative to each other is as follows: between a first tooth and a second tooth an angle of 120°, between said second tooth and a third tooth an angle of 105°, and finally an angle of 135° between said third tooth and said first tooth, said first tooth also being disposed in alignment with a marking means previously provided on the periphery of the cutter.

10. A tool assembly according to claim 1 characterised in that the adapter is an integral component, and comprises a casing portion which is intended to be screwed to the guide, an end portion having a screwthread, and, between said casing portion and said screwthread a manual clamping wheel.

11. A tool assembly according to claim 1 characterised in that the guide is provided on its outside surface with at least one means for marking the forward movement of the guide, formed by a flat portion extending along a generating line, or formed by at least one punching.

12. A tool assembly according to claim 1 characterised in that the guide, the adapter and the actuating means formed by a wheel member for driving the tool carrier shaft are moulded, preferably of plastics material.

13. A tool assembly according to claim 12 characterised in that the wheel member is fixed to the tool carrier shaft, said wheel means comprising an oblong portion with a rapid drive knob portion disposed thereon.

14. A tool assembly according to claim 12 characterised in that the guide carries the tool carrier shaft on the one hand by means of a nut bearing against a bottom portion of the guide and screwed on to a screw-threaded portion provided for that purpose of said shaft, and on the other hand by means of a friction washer trapped between the inner face of said bottom portion of the guide and a shoulder provided in the tool carrier shaft, which nut can be non-rotatably locked by means of a lock nut means.

15. A tool assembly according to claim 14 characterised in that the lock nut means comprises the wheel member for driving the tool carrier shaft.

16. A tool assembly according to claim 12 characterised in that the wheel member for driving the tool carrier shaft comprises a screwthread adapted to form an abutment means at the end of a screw-threaded portion of the tool carrier shaft, and is adapted to bear against the upper end face of the guide with a minimum clearance necessary for rotation thereof.

17. A tool assembly according to claim 12 characterised in that the tool carrier shaft drive wheel member is moulded on to a screw-threaded portion of the tool carrier shaft.

* * * * *